United States Patent [19]
Hauser

[11] Patent Number: 5,509,864
[45] Date of Patent: Apr. 23, 1996

[54] SPLIT RING AXIAL POSITIONER FOR PLANETARY GEAR ASSEMBLY

[75] Inventor: Kenneth C. Hauser, Canton, Mich.

[73] Assignee: General Motors Corporation, Detroit, Mich.

[21] Appl. No.: 362,225

[22] Filed: Dec. 22, 1994

[51] Int. Cl.$^6$ .............................. B25G 3/00; F16H 3/44; F16H 57/08
[52] U.S. Cl. .................. 475/316; 475/331; 475/346; 403/344
[58] Field of Search ................... 475/311, 316, 475/317, 321, 331, 344, 346; 403/344

[56] References Cited

U.S. PATENT DOCUMENTS

| | | | |
|---|---|---|---|
| 3,077,115 | 2/1963 | Chapman, Jr. | 475/316 X |
| 3,780,601 | 12/1973 | Dach et al. | 475/331 X |
| 4,422,793 | 12/1983 | Mandich | 403/344 X |
| 4,440,282 | 4/1984 | Ishimaru et al. | 475/331 X |
| 5,267,918 | 12/1993 | Shiroyama | 475/331 |
| 5,352,055 | 10/1994 | Hellon et al. | 403/344 X |
| 5,370,590 | 12/1994 | Premiski et al. | 475/346 |

FOREIGN PATENT DOCUMENTS

| | | | |
|---|---|---|---|
| 332418 | 10/1903 | France | 403/344 |
| 406221385 | 8/1994 | Japan | 475/316 |
| 1557374 | 4/1990 | U.S.S.R. | 403/344 |

*Primary Examiner*—Dirk Wright
*Assistant Examiner*—Khoi Q. Ta
*Attorney, Agent, or Firm*—Donald F. Scherer

[57] ABSTRACT

A friction torque establishing device and a ring gear are assembled with a positioner ring between a housing of the torque establishing device and the ring gear. The positioner ring has a split sleeve with a living hinge portion which permits the assembly of the ring between the housing and a toothed portion of the ring gear along a hub member. The sleeve also has locator pins and a latch mechanism integrally formed therewith to assure proper location relative to the gear and for latching the ring gear on the hub after assembly.

2 Claims, 2 Drawing Sheets

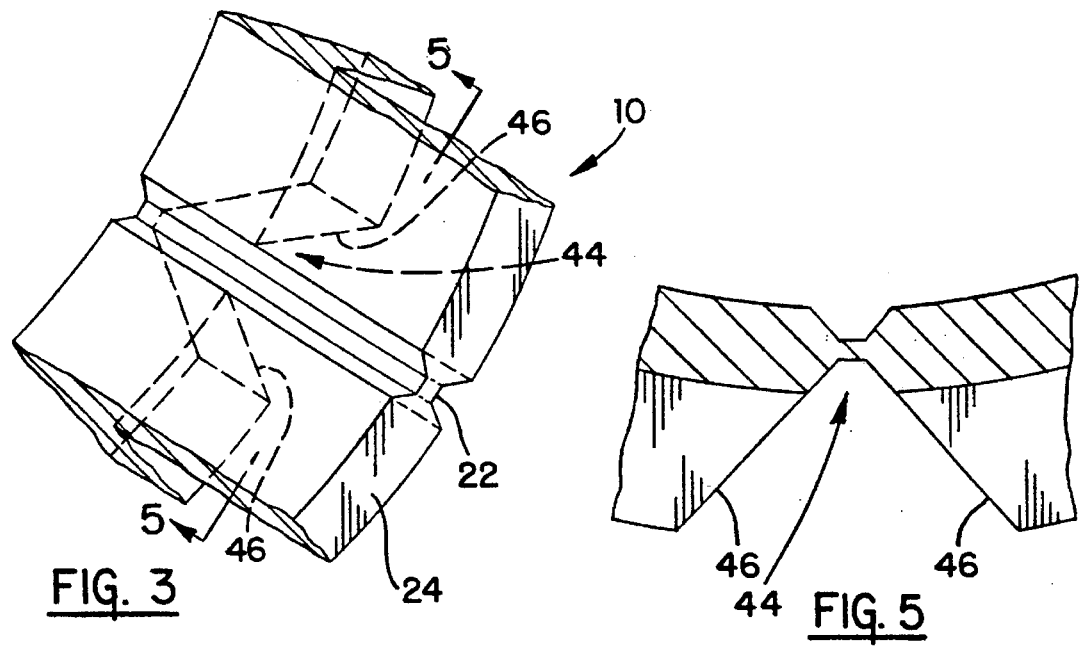
FIG. 3
FIG. 5
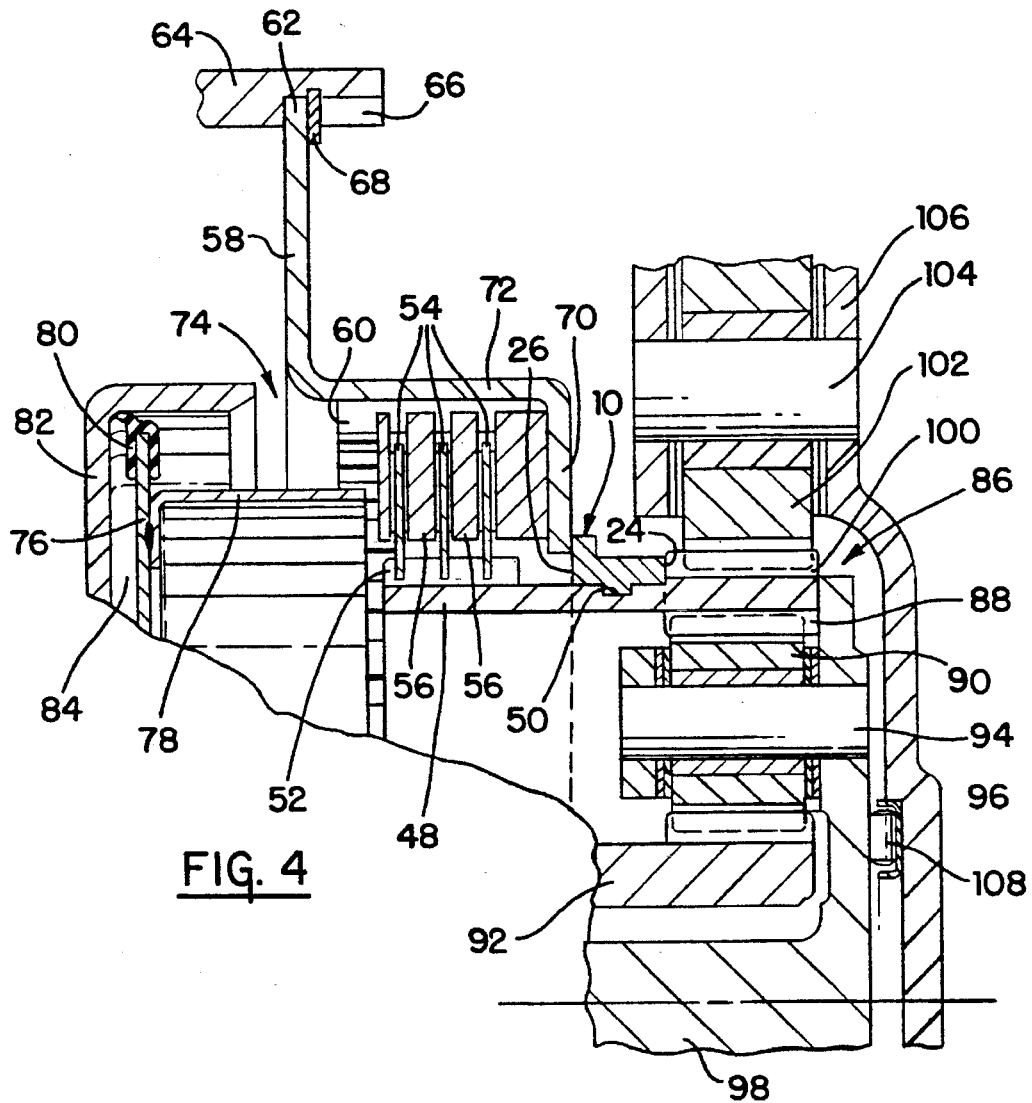
FIG. 4

SPLIT RING AXIAL POSITIONER FOR PLANETARY GEAR ASSEMBLY

TECHNICAL FIELD

This invention relates to gear assemblies, and more particularly, to devices for positioning a ring gear and a housing for a friction device assembly.

BACKGROUND OF THE INVENTION

The power transmissions often require a gear member and associating friction device, such as a clutch or brake, to be mounted axially spaced from each other within a housing. The ring gear is positioned along a hub member. This positioning usually occurs with the use of a retainer ring which is fixed in a circumferential groove on a hub following assembly of the ring gear to the hub. Also in such assemblies, a friction device is mounted axially along the hub to which the ring gear is secured and the housing of the friction device quite often must be retained relative to the hub, thus requiring an additional retaining ring.

SUMMARY OF THE INVENTION

It is an object of the present invention to provide an improved gear assembly having a positioning ring to locate a ring gear relative to a housing.

An aspect of this invention is found in a latch mechanism formed integrally on the positioner ring which permits latching of the ring after assembly about a hub.

Another aspect found herein is a living hinge formed integrally on the ring, preferably diametrically opposed to the latch mechanism to permit opening or splaying of the ring at assembly.

A further aspect of the invention is seen in the annular thrust faces formed at the axial outer end surfaces on the ring.

The present invention will permit the ring gear to be formed integral with a hub member which also forms the inner portion or drive member for a friction device, such as a clutch or brake.

The hub can be disposed within the housing normally associated with the friction device prior to the positioner ring being placed between the housing and the ring gear portion of the hub member. The positioner ring is preferably formed of a plastic material and has integrally formed thereon a living hinge portion which permits the ring gear to be splayed open. When the ring is splayed open, it can be placed around the annular hub portion of the ring gear and then secured thereon by an integral latching mechanism. This permits the installation or assembly of the positioner ring without the use of anything other than a simple tool, such as a pair of pliers or screwdriver.

DESCRIPTION OF THE DRAWINGS

FIG. 3 is an enlarged view of another portion of the positioner ring shown in FIG. 1.

FIG. 4 is a cross-sectional elevational view of a gear assembly of a power transmission incorporating the positioner ring of FIG. 1.

FIG. 5 is a view taken along line 5—5 of FIG. 3.

DESCRIPTION OF THE PREFERRED EMBODIMENT

Figure 1:
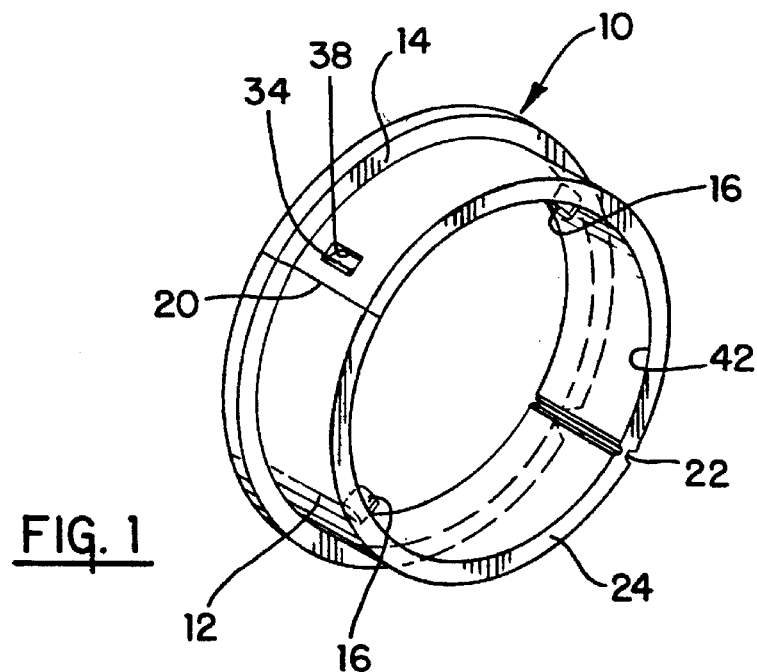
FIG. 1 is an isometric view of a positioner ring utilized with the present invention.

Referring to the drawings, wherein like characters represent the same or corresponding parts throughout the several views, there is viewed a positioner ring generally designated 10 having an annular body sleeve portion 12, an annular flange 14, a pair of locating pins 16 and a latch assembly 18. The sleeve 12 and annular flange 14 have a split or opening portion 20 which permits the positioner ring 10 to be pivoted at a hinge 22 formed in the sleeve 12.

Figure 2:
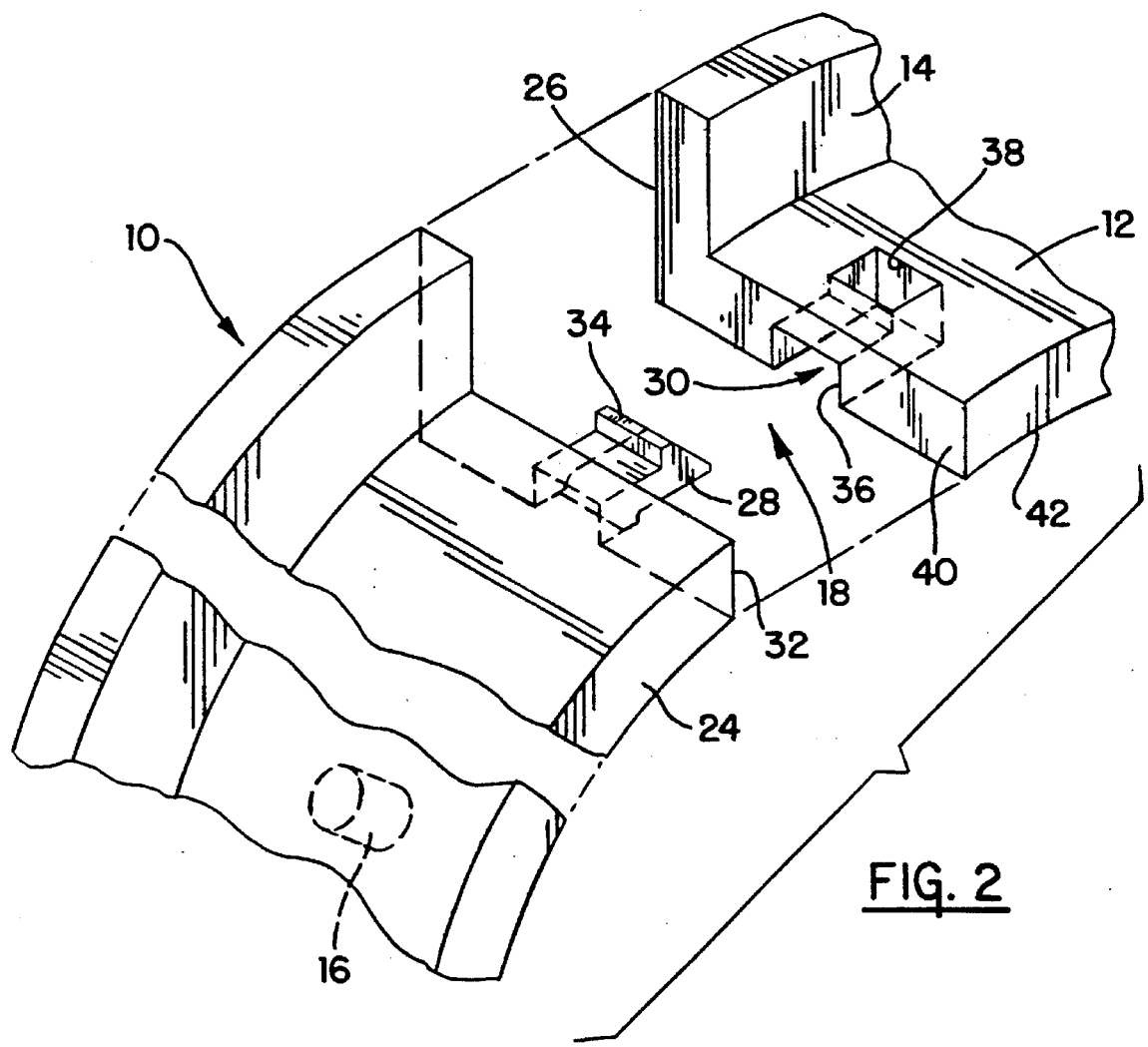
FIG. 2 is an enlarged view showing a portion of the positioner ring viewed in FIG. 1.

The sleeve 12 has an annular end thrust face 24 and the flange 14 has an annular end thrust face 26. The positioner ring 10 can be opened at the split 20 (FIG. 2) and the sleeve can be closed by the latch assembly 18. As best seen in FIG. 2, the latch mechanism 18 includes a latch hook 28 and a latch opening 30. The latch hook 28 is integrally formed with the sleeve 12 and extends circumferentially from a face 32 of the split 20. The latch assembly 18 has a hook portion 34 adapted to fit in the latch opening 30 which is formed in the sleeve 12. The latch opening 30 has a circumferential passage 36 which extends from a radial opening 38 to a surface 40 which serves as one side of the split 20.

The locator pins 16 are integrally formed with the sleeve 12 and extend radially inward from an inner circumference 42. The locator pins 16 are preferably diametrically opposed and are displaced 90° from the hinge 22 which is diametrically opposed to the latch mechanism 18 and the split 20.

As best seen in FIG. 5, the flange 14 has a open portion 44 comprised of diverging side walls 46 which extend outwardly from the hinge 22. The opening 44 permits the positioner ring to be opened about the hinge 22 until the diverging side walls 46 come into contact with each other, thereby limiting the annular opening of the positioner ring 10.

As best seen in FIG. 4, the positioner ring 10 is disposed on a hub 48 and located thereon by each locator pin 16 being disposed in a respective locating recess 50. The hub 48 has formed at the left end thereof a spline portion 52 adapted to engage a plurality of friction plates 54. The friction plates 54 are interspersed with friction plates 56 which are secured to a hub 58 along a spline 60. The hub 58 has an outer diameter 62 which is splined to a housing 64 at a spline member 66. The hub 58 is retained in the spline 66 by a conventional retainer ring 68.

The hub 58 has an annular portion 70 which extends radially inward from a circumferential portion 72 in which the spline 60 is formed. The annular portion 70 surrounds the hub 48 to form an end wall for a friction device generally designated 74 which is comprised of the friction plates 54 and 56 and a piston 76. The piston 76 has an annular axially extending apply member 78 adapted to enforce frictional engagement between the friction plates 54 and 56 when it is desired to engage the friction device 74. The piston 76 has disposed thereon an annular seal 80 which sealingly and slidably engages a housing 82 which is preferably secured to or integral with the housing 64.

The piston 76 and housing 82 cooperate to form a fluid chamber 84 which may be pressurized in a well known manner to enforce engagement of the piston 76 with the friction plates 54 and 56. When the chamber 84 is pressurized, the friction device 74 will be engaged, such that the hub 48 and the housing 64 will be retained together. If the friction device is a fluid operated clutch, the hub 48 and housing 64 will rotate in unison, whereas if the friction device 74 is a brake, the engagement thereof will hold the hub stationary to the housing 64.

The retainer or positioner ring 10 has the thrust face 26 disposed in abutment with the annular portion 70 and the thrust face 24 disposed in abutment with a gear portion 86 integrally formed with the hub 48. In the particular gear assembly shown, the gear 86 serves as a ring gear for one planetary group and as a sun gear for another planetary group. The gear 86 has inner teeth 88 which form a ring gear meshing with a plurality of pinion gears 90 which in turn mesh with a sun gear 92. The pinion gears 90 are rotatably mounted on pins 94 which are secured to a carrier 96 which in turn is integrally formed or otherwise secured or drivingly connected with a shaft 98. As is well known with such devices, if the sun gear 92 is rotated and the gear 86 is held stationary, the carrier 96 will rotate in the same direction as the sun gear 92 but at a reduced speed.

The gear 86 has an outer set of teeth 100 which form a sun gear meshing with the teeth on pinion gears 102. The pinion gears 102 are rotatably supported on pins 104 which are secured to a carrier 106. The pinion gears 102 also mesh with a conventional ring gear, not shown.

A thrust bearing 108 is disposed between the carriers 96 and 106 to absorb thrust forces which will be induced on the gear portion 86 when the power transmission through the gearing is in one direction, preferably when the engine (not shown) is driving the vehicle output (not shown).

When the power path is in the opposite direction, that is, the vehicle is driving the engine, the thrust on the gear portion 86 is in the opposite direction, such that it is absorbed through the retainer or positioner ring 10 and the hub 58 to the housing 64.

In viewing FIG. 4, it should be apparent that the friction device 74 can be fully assembled with the hub 48 being positioned with its respective friction plates inside of the housing or hub 58. After this positioning takes place, the ring 10 can be installed about the outer diameter or surface of the hub 48, thereby positioning the hub 48 and its gear portion 86 relative to the hub 58. This assembly is accomplished by simply splaying open the positioner ring 12 and the hinge 22 while positioning the ring 10 about the hub 48.

Once the ring 10 is thus positioned, it can be rotated on the hub 48 until the locator pins 16 engage the respective locating recesses 50, after which the latch mechanism 18 can be closed by engaging the latch 28 into the opening 30. Thus, the ring 10 will remain positioned on the hub 48. It is possible to disassemble the ring 10 from the hub 48 by contacting the hook 34 with a simple screwdriver and pressing radially inward until the hook 34 is aligned with the opening 36 and the positioner ring 10 can be opened pivotally about the hinge 22 and the ring 10 can be removed, if desired. This will permit simple assembly and disassembly of the gear arrangement, as shown in FIG. 4.

The remainder of the gear elements, namely, the carrier 106 and its assembled pinions 102 can be mounted on the gear portion 86 following assembly of the positioner ring 10.

It should be apparent at this point, that the present invention reduces the complexity of manufacture and assembly of planetary gear members and their respective fluid operated friction devices. The present invention permits the splined hub 48 and the gear portion 86 to be integrally formed with a minimum of machining to establish the proper retaining surfaces.

The latching mechanism 18 is essentially self-locking when the ring is closed about the hub 48 with the locator pins 16 aligned in their locating recesses 50. The latch 28 must move radially inward to be latched. Accordingly, the centrifugal forces acting on the assembly during rotation will tend to maintain the latch mechanism in a locked position, such that inadvertent unlatching will not occur. The latch mechanism, by incorporating the radial opening 38, permits for visual verification that the latching mechanism is properly assembled prior to the gear assembly being positioned with a closed structure.

While the locating devices of the ring 10 as shown are the pins 16 and the recesses 50, other retaining structures can be utilized. For example, the spline 52 can be extended along the hub 48 and the inner surface of the sleeve 12 can have a mating spline which will mate with the spline 52 when the positioner 10 is assembled onto the hub 48.

The embodiments of the invention in which an exclusive property or privilege is claimed are defined as follows:

1. In combination, a gear assembly and positioner comprising:

a housing;

a friction engaging device having one portion drivingly connected with the housing;

a ring gear having a hub extension comprising another portion of the friction engaging device and a gear portion;

a positioner disposed between the ring gear and the one portion comprising;

an annular flange portion disposed for abutment with said one portion;

a sleeve extending axially from the flange circumjacent a portion of the hub extension intermediate the one portion and the gear portion and having an end face disposed for abutment with the gear portion;

an axial extending split extending through the flange portion and the sleeve;

a hinge diametrically opposite the axial split for permitting opening, if the positioner at the split for motivating on the hub extension;

hook and opening latching means for removably securing said positioner at the axial split, and locating means on said positioner and said hub for limiting rotary movement of the positioner relative to the hub, said positioner being disposed to maintain a minimum distance between the gear portion and the one portion.

2. The combination defined in claim 1 further wherein:

means for locating the positioner on the hub extension are formed on an inner surface of the sleeve and an outer surface of the hub extension.

* * * * *